United States Patent
Resh

(10) Patent No.: US 6,237,939 B1
(45) Date of Patent: May 29, 2001

(54) INFLATABLE CURTAIN

(75) Inventor: Robert E. Resh, Dryden, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/489,480

(22) Filed: Jan. 21, 2000

(51) Int. Cl.$^7$ .................................................. B60R 21/22
(52) U.S. Cl. ........................................ 280/730.2; 280/749
(58) Field of Search .............................. 280/730.2, 730.1, 280/749

(56) References Cited

U.S. PATENT DOCUMENTS

| | | |
|---|---|---|
| 5,265,903 | 11/1993 | Kuretake et al. . |
| 5,462,308 | 10/1995 | Seki et al. . |
| 5,588,672 | 12/1996 | Karlow et al. . |
| 5,707,075 | 1/1998 | Kraft et al. . |
| 5,788,270 | 8/1998 | Haland et al. . |
| 5,865,462 | 2/1999 | Robins et al. . |
| 5,899,491 | 5/1999 | Tschaeschke . |
| 6,073,961 * | 6/2000 | Bailey et al. ............... 280/730.2 |
| 6,095,551 * | 8/2000 | O'Docherty .................. 280/749 |
| 6,106,007 * | 8/2000 | Kretschmer et al. ......... 280/730.2 |

FOREIGN PATENT DOCUMENTS 9743146   11/1997 (WO) .

\* cited by examiner

*Primary Examiner*—Paul N. Dickson
(74) *Attorney, Agent, or Firm*—Tarolli, Sundheim, Covell, Tummino & Szabo, L.L.P.

(57) ABSTRACT

Apparatus (10) for helping to protect an occupant of a vehicle (12) that has a side structure (16) and a roof (18) comprises an inflatable vehicle occupant protection device (14). The inflatable vehicle occupant protection device (14) is inflatable away from the vehicle roof (18) into a position between the side structure (16) of the vehicle (12) and a vehicle occupant. The inflatable vehicle occupant protection device (14), when inflated, has a bottom edge (52) spaced apart from the vehicle roof (18) and front and rear bottom corners (60 and 62). An inflation fluid source (24) provides inflation fluid for inflating the inflatable vehicle occupant protection device (14). The apparatus (10) includes a flexible elongated member (70) that has a first end (72) connected to the side structure (16) of the vehicle (12) at a first location (76). The flexible elongated member (70) also has an opposite second end (74) connected to the inflatable vehicle occupant protection device (14) at a second location (82). The second location (82) is spaced away from the corners (60 and 62) of the inflatable vehicle occupant protection device (14).

15 Claims, 3 Drawing Sheets

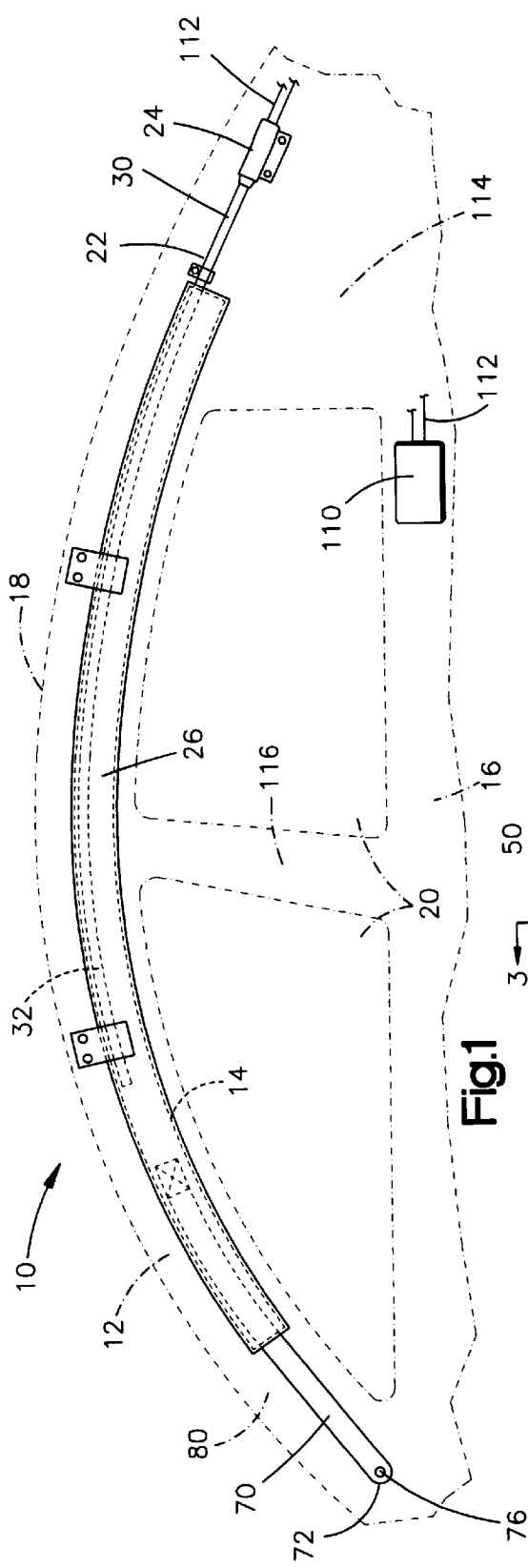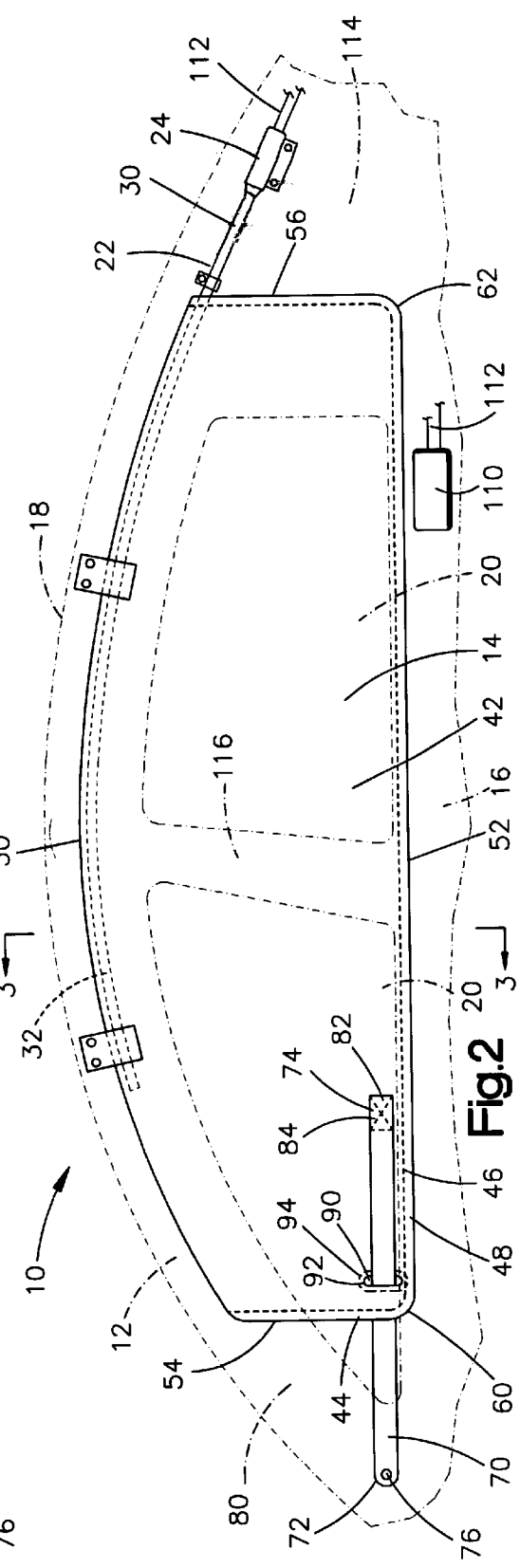

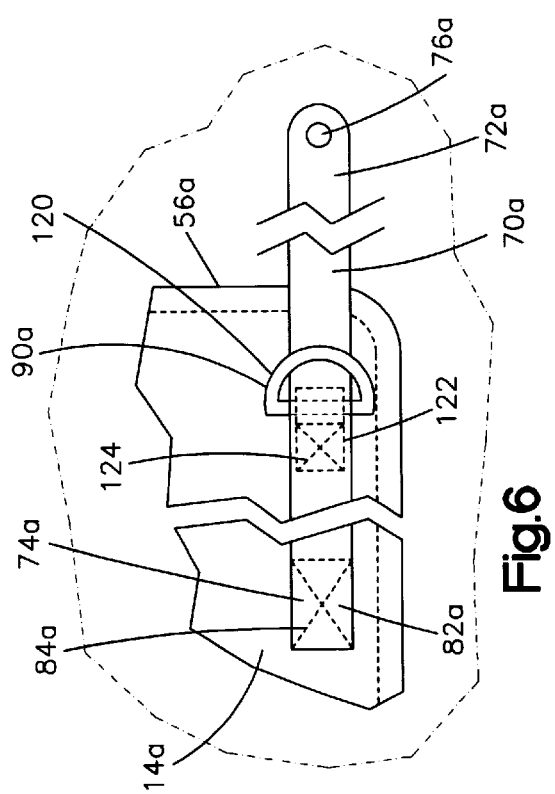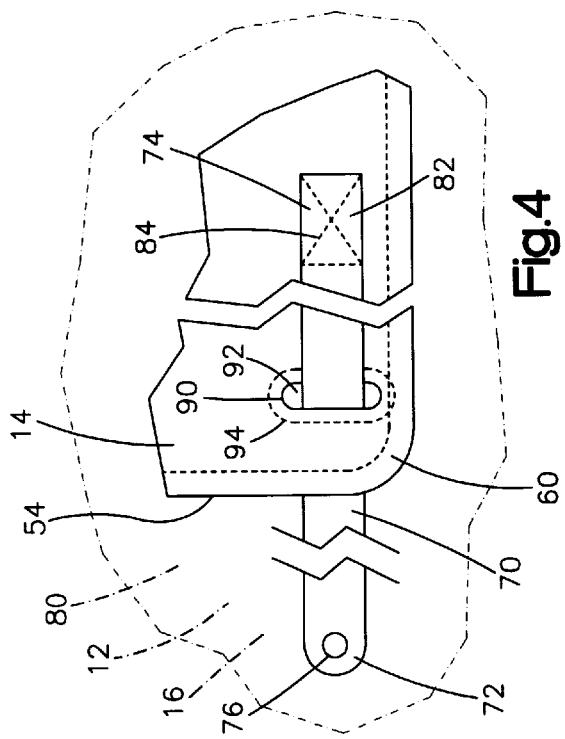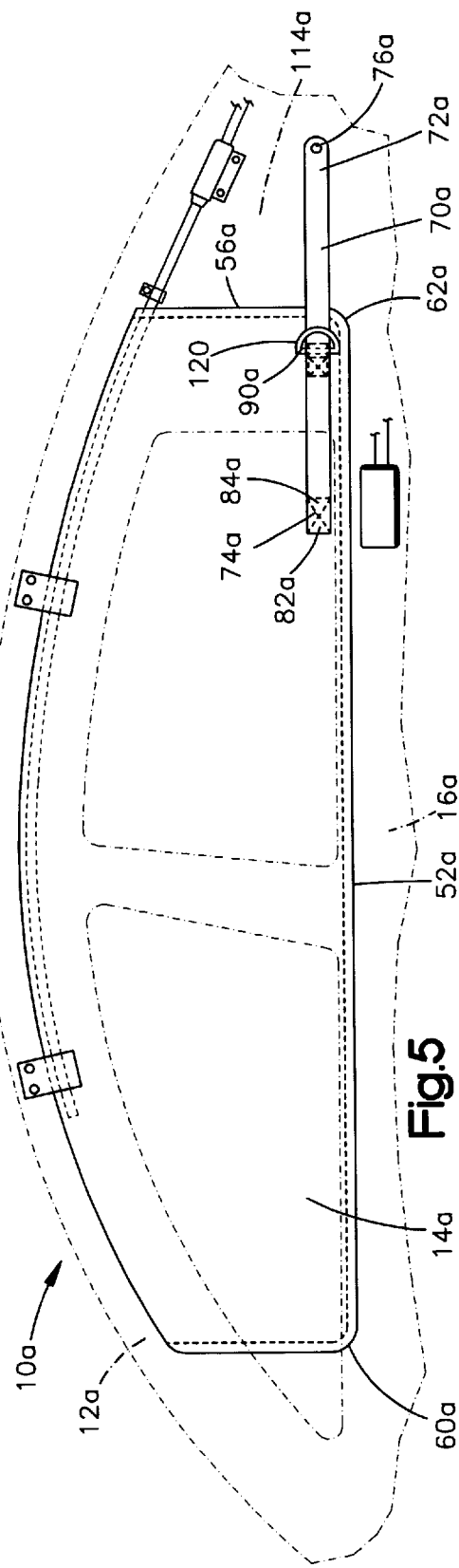

INFLATABLE CURTAIN

FIELD OF THE INVENTION

The present invention relates to an inflatable vehicle apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. The inflatable vehicle occupant protection device, when inflated, has a bottom edge spaced apart from the vehicle roof and front and rear bottom corners. An inflation fluid source provides inflation fluid for inflating the inflatable vehicle occupant protection device. The apparatus includes a flexible elongated member that has a first end connected to the side structure of the vehicle at a first location and an opposite second end connected to the inflatable vehicle occupant protection device at a second location. The second location is spaced away from the corners of the inflatable vehicle occupant protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle apparatus illustrating the apparatus in a deflated condition;

FIG. 2 is a schematic view of the vehicle apparatus of FIG. 1 in an inflated condition;

FIG. 4 is an enlarged view of a portion of the vehicle apparatus of FIG. 2;

FIG. 5 is a schematic view of a vehicle apparatus according to a second embodiment of the invention; and FIG. 6 is an enlarged view of a portion of the vehicle apparatus of FIG. 5.

DESCRIPTION OF PREFERRED EMBODIMENTS

Figure 3:
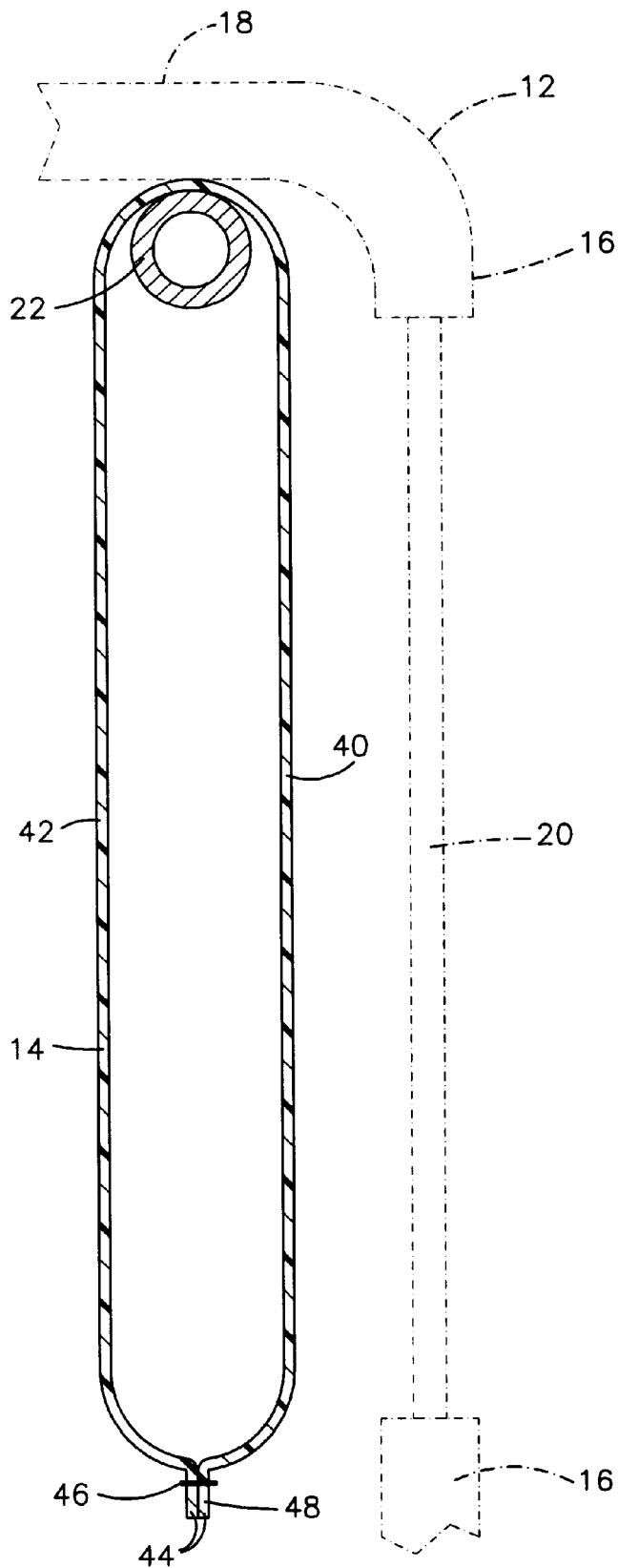
FIG. 3 is a sectional view of the vehicle apparatus taken generally along line 3—3 in FIG. 2.

As representative of the present invention, a vehicle apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle.

The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along a portion of the perimeter 48 of the inflatable curtain 14.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together to form the inflatable curtain 14, in which case the panels 40, 42 would be secured together at selected locations by interwoven portions.

The first and second panels 40 and 42 are constructed of a fabric, such as nylon, that is coated with a gas impermeable material, such as urethane or silicone, to form an inflatable volume. The inflatable curtain 14 thus has a substantially air-tight construction. Other materials, such as elastomers, plastic films, or combinations thereof, may also be used to construct the inflatable curtain 14. The first and second panels 40 and 42 may also be formed of single or multi-layered sheets of material.

The perimeter 48 (FIG. 2) of the inflatable curtain 14 is defined by upper and lower edges 50 and 52, respectively, of the curtain and horizontally spaced front and rear edges 54 and 56, respectively, of the curtain. The front and rear edges 54 and 56 of the inflatable curtain 14 extend from the upper edge 50 to the lower edge 52 of the curtain. A bottom front corner 60 of the inflatable curtain 14 is defined by the intersection of the front edge 54 and the lower edge 52 of the curtain. A bottom rear corner 62 of the inflatable curtain 14 is defined by the intersection of the rear edge 56 and the lower edge 52 of the curtain. Although the front and rear edges 54 and 56 of the inflatable curtain 14 are illustrated as being generally vertical, they could extend at some other angle. Also, the front edge of the curtain, in particular, could be formed by extending the upper and lower edges 50 and 52 until they intersect, in which case the bottom front corner 60 would be defined by the intersection of the upper and lower edges.

The apparatus 10 (FIG. 2) also includes a flexible elongated member 70 that connects the inflatable curtain 14 to the side structure 16 of the vehicle 12. In the embodiment illustrated in FIG. 2, the flexible elongated member 70 comprises a tether constructed of a material such as fabric. In the deflated condition (FIG. 1), a portion of the flexible elongated member 70 is stored in the housing 26 along the vehicle roof 18 and side structure 16 of the vehicle 12 above the side windows 20. Another portion of the flexible elongated member 70 is stored outside the housing 26 and extending along an A pillar 80 of the vehicle.

As illustrated in FIGS. 2 and 4, the flexible elongated member 70 has a first end 72 and an opposite second end 74. The first end 72 of the flexible elongated member 70 is fixedly connected to the side structure 16 of the vehicle 12 at a first location 76. The first location 76 is positioned forward of the front edge 54 of the inflatable curtain 14, on or near the A pillar 80 of the vehicle 12. The second end 74 of the flexible elongated member 70 is secured to the inflatable curtain 14 at a second location 82 by known means 84 such as stitching. The second location 82 is spaced away from the front and rear corners 60 and 62 of the inflatable curtain 14, and is positioned along the bottom edge 52 of the curtain.

The apparatus 10 includes a guide 90 located on the inflatable curtain 14 between the first and second locations 76 and 82, adjacent to the front bottom corner 60. In the embodiment illustrated in FIG. 4, the guide 90 is formed by an edge of the inflatable curtain 14 that defines an aperture 92 extending through a portion of the inflatable curtain 14. The aperture 92 is surrounded by stitching 94 that reinforces the inflatable curtain 14 around the aperture and helps to prevent leakage of inflation fluid through the aperture.

The flexible elongated member 70 has a length greater than the distance between the first location and the adjacent front bottom corner 60 of the inflatable curtain 14. The flexible elongated member 70 extends from the first location 76 through the guide 90 to the second location 82. The guide 90, and thus the inflatable curtain 14, may move relative to the flexible elongated member 70. The guide 90 and the flexible elongated member 70 cooperate such that the guide, and thus the inflatable curtain 14 is slidable on the flexible elongated member.

The vehicle 12 includes a sensor mechanism 110 (shown schematically in FIGS. 1 and 2) for sensing a side impact to the vehicle 12 and/or a rollover of the vehicle 12. The sensor mechanism 110 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 110 provides an electrical signal over lead wires 112 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 is positioned adjacent to the intersection of the roof 18 and the side structure 16 of the vehicle 12. The front edge 54 is positioned adjacent to the A pillar 80 of the vehicle 12. The rear edge 56 of the inflatable curtain 14 is positioned adjacent to a C pillar 114 of the vehicle 12. The inflatable curtain 14 extends between the A pillar 80 and the C pillar 114 of the vehicle 12 and overlies at least a portion of the A pillar, C pillar, and a B pillar 116 of the vehicle.

It will be recognized by those skilled in the art that the inflatable curtain 14 may have alternative configurations. For example, in the illustrated embodiment, the inflatable curtain 14 extends between the A pillar 80 and the C pillar 114 of the vehicle 12. The inflatable curtain 14 could, however, extend between the A pillar 80 and the B pillar 116 only or between the B pillar and the C pillar 114 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 is positioned along the side structure 16 of the vehicle 12 and helps to absorb the energy of impacts with the inflatable curtain and helps to distribute the impact energy over a large area of the curtain.

When the inflatable curtain 14 is in the stored position of FIG. 1, the guide 90 is positioned at a location along the length of the flexible elongated member 70. The location may be different than the location on the flexible elongated member at which the guide is positioned when the curtain is in the inflated condition of FIG. 2. As the inflatable curtain 14 inflates, the guide 90 and the curtain move along the flexible elongated member 70 as the curtain deploys to the inflated condition.

The length of the flexible elongated member 70 is approximately equal to the distance between the first and second locations 76 and 82 when the inflatable curtain 14 is inflated. The connection 82 is disposed in the housing 26 when the curtain 14 is in its deflated condition with the flexible elongated member 70 extending along the A pillar 80. Also, the length of the flexible elongated member 70 is such that relatively little slack is produced in the flexible elongated member when the inflatable curtain 14 is inflated. Because the guide 90 is located in the front bottom corner 60, the flexible elongated member 70 holds the corner and the lower edge 52 of the inflatable curtain 14 positioned adjacent the side structure 16 of the vehicle 12.

In the embodiment illustrated in FIGS. 1–4, the flexible elongated member 70 and guide 90 are associated with the front bottom corner 60 of the inflatable curtain 14. An identical flexible elongated member and guide, not shown, may be associated with the rear bottom corner 62.

A second embodiment of the present invention is illustrated in FIGS. 5 and 6. The second embodiment of the invention is similar to the first embodiment of the invention illustrated in FIGS. 1–4. Accordingly, numerals similar to those of FIGS. 1–4 will be utilized in FIGS. 5 and 6 to identify similar components, the suffix letter "a" being associated with the numerals of FIGS. 5 and 6 to avoid confusion. The apparatus 10a (FIGS. 5 and 6) of the second embodiment is identical to the apparatus 10 (FIGS. 1–4), except that the guide 90a (FIGS. 5 and 6) has a different construction than the guide 90 (FIGS. 1–4) of the first embodiment.

As illustrated in FIGS. 5 and 6, the first end 72a of the flexible elongated member 70a is fixedly connected to the side structure 16a of the vehicle 12a at a first location 76a. The first location 76a is positioned rearward of the rear edge 56a of the inflatable curtain 14a, on or near the C pillar 114a of the vehicle 12a. The second end 74a of the flexible elongated member 70a is secured to the inflatable curtain 14a at the second location 82a by the means 84a. The second location 82a is spaced away from the front and rear corners 60a and 62a of the inflatable curtain 14a, and is positioned along the bottom edge 52a of the curtain.

The guide 90a is located on the inflatable curtain 14a between the first and second locations 76a and 82a, adjacent to the rear bottom corner 62a. In the embodiment illustrated in FIG. 6, the guide 90a is a ring 120, such as a D-ring, that is connected to the inflatable curtain 14a by known means 122, such as stitching. The ring 120 may include a base 124 constructed of a material, such as fabric, that is connected to the inflatable curtain 14a by the means 122. The base 124 attaches the ring 120 to the inflatable curtain 14a.

The flexible elongated member 70a has a length greater than the distance between the first location and the adjacent rear bottom corner 62a of the inflatable curtain 14a. The flexible elongated member 70a extends from the first location 76a through the guide 90a to the second location 82a. The guide 90a, and thus the inflatable curtain 14a, may move relative to the flexible elongated member 70a. The guide 90a and the flexible elongated member 70a cooperate such that the guide is slidable on the flexible elongated member.

The guide 90a (FIG. 6) of the second embodiment has a different configuration than the guide 90 (FIG. 4) of the first embodiment. It will be recognized by those skilled in the art, however, that the guides may be interchanged without negatively affecting the operation of the present invention. For example, the guide 90a (FIG. 6) of the second embodiment may be incorporated into the configuration of the vehicle apparatus 10 (FIG. 4) of the first embodiment or vice versa.

From the above description of the invention, those skilled in the art will perceive improvements, changes and modifications. For example, in the illustrated embodiments, the first location 76, 76a, the guide 90, 90a, and the second location 82, 82a are aligned horizontally when the inflatable curtain is in the inflated condition. The first location, however, may be positioned below the bottom edge of the inflated inflatable curtain. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is adapted to inflate away from the vehicle roof into a position between the side structure of the vehicle and a vehicle occupant, said inflatable vehicle occupant protection device, when inflated, having a bottom edge and spaced front and rear bottom corners;

an inflation fluid source that provides inflation fluid for inflating said inflatable vehicle occupant protection device;

a flexible elongated member having first and second opposite ends, said first end being adapted to connect to the side structure of the vehicle at a first location adjacent one of said front and rear bottom corners, said second end being adapted to connect to said inflatable vehicle occupant protection device at a second location spaced away from said one of said front and rear bottom corners of said inflatable vehicle occupant protection device, said flexible elongated member having a length greater than the distance between said first location and said one of said front and rear bottom corners when said inflatable vehicle occupant protection device is inflated; and a guide on said inflatable vehicle occupant protection device located between said first and second locations, said guide and said flexible elongated member cooperating such that said guide slides on said flexible elongated member when said inflatable vehicle occupant protection device is inflated.

2. Apparatus as defined in claim 1, wherein said guide is located near said corner of said inflatable vehicle occupant protection device adjacent said first location.

3. Apparatus as defined in claim 1, wherein said guide comprises an edge of said inflatable vehicle occupant protection device that defines an aperture extending through said inflatable vehicle occupant protection device, said flexible elongated member extending through said aperture.

4. Apparatus as defined in claim 1, wherein said guide comprises a D-ring that is fastened to said inflatable vehicle occupant protection device, said flexible elongated member extending through said ring.

5. Apparatus as defined in claim 1, wherein said flexible elongated member is a tether.

6. Apparatus as defined in claim 1, wherein said first location is on an A pillar of the vehicle.

7. Apparatus as defined in claim 1, wherein said guide is positioned near said front corner of said inflatable vehicle occupant protection device.

8. Apparatus as defined in claim 1, wherein said first location is on a C pillar of the vehicle.

9. Apparatus as defined in claim 8, wherein said guide is positioned near said rear corner of said inflatable vehicle occupant protection device.

10. Apparatus as defined in claim 1, wherein said inflatable vehicle occupant protection device when inflated is adapted to extend along the side structure of the vehicle between an A pillar and a C pillar of the vehicle.

11. Apparatus as defined in claim 1, wherein said inflatable vehicle occupant protection device, when inflated, is adapted to overlie at least a portion of an A pillar, a B pillar and a C pillar of the vehicle.

12. Apparatus as defined in claim 1, wherein said inflatable vehicle occupant protection device is an inflatable curtain having a stored position wherein said inflatable curtain is adapted to extend along the side structure adjacent to the vehicle roof, said inflatable curtain being adapted to inflate away from the vehicle roof into said position between the side structure of the vehicle and a vehicle occupant.

13. Apparatus as defined in claim 12, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

14. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

15. Apparatus as defined in claim 1, wherein said inflation fluid source comprises an inflator that is actuatable to inflate said inflatable vehicle occupant protection device.

\* \* \* \* \*